Sept. 22, 1931. F. B. TROUTMAN 1,823,960
TOTALIZING COUNTER
Filed Feb. 17, 1930
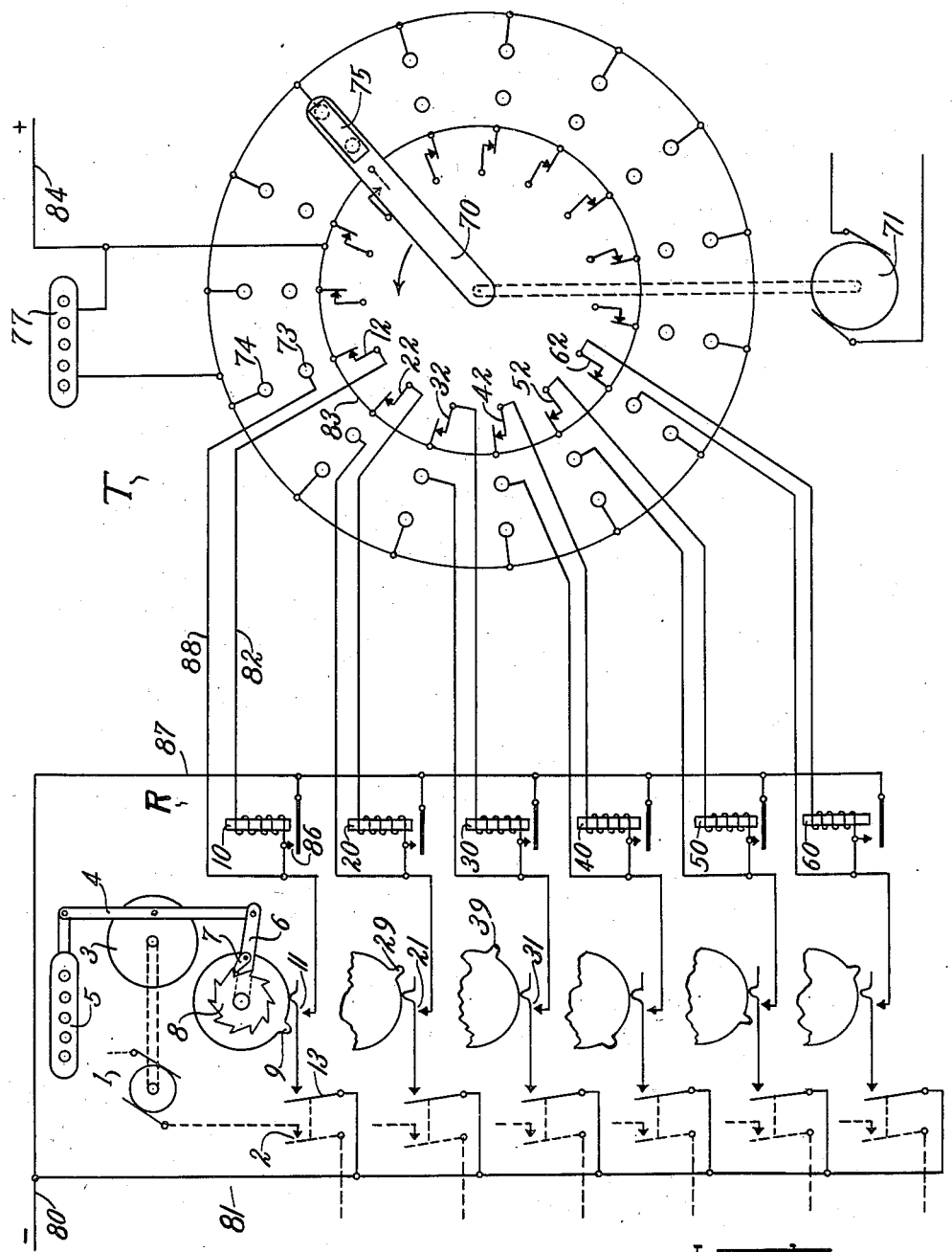
Inventor
Ferdinand B. Troutman
Brown, Jackson, Boettcher & Dienner
Atty.

Patented Sept. 22, 1931

1,823,960

UNITED STATES PATENT OFFICE

FERDINAND B. TROUTMAN, OF ELMHURST, ILLINOIS

TOTALIZING COUNTER

Application filed February 17, 1930. Serial No. 428,978.

This invention relates, in general, to counters, and more particularly to totalizing counters for totalizing the count of a number of separately independent counters. While the invention is of general application, it is particularly useful in press rooms where there may be a number of presses doing the same kind of work and it is desired to have, instantly available, an indication of the total numbers of papers, or the like, turned out by all of the presses. Heretofore, it has been customary to provide each press with a counter for indicating the total number of papers turned out by it and, in order to determine the total number of papers turned out by all of the presses, it was necessary to totalize the separate readings of the counters.

The difficulty with such a procedure may be comprehended when it is realized that each press may be turning out papers at the rate of 48,000 per hour, or 800 per minute, and there may be ten or fiteeen presses in operation. By the time that the foreman has taken the reading of the indicator on the last press and added up the totals, the first press may have turned out several thousand additional copies. It is one of the objects of the present invention to provide a single register for constantly totalizing the readings of the counters on the respective machines whereby the total number of copies turned out by all of the machines can be instantly determined. My totalizing mechanism includes a registering device which has an individual relay for each press, each relay being arranged to receive an impulse of current for every one hundred, or so, papers turned out by it. It is, of course, to be understood that this number is arbitrary and the apparatus may be designed to send one impulse of current for any other given number of papers turned out by the press. The relays are arranged to be locked in their operated position upon energization and remain so until released by a combined testing and releasing device. The testing and releasing device tests each relay periodically and for each operated relay that is found, it sends one impulse of current to a totalizing counter. The testing device is operated at a speed which is determined by the maximum possible speed of the presses and is arranged to test each relay at intervals of time which are less than the minimum interval that may be required for a press to turn out 100 copies of the paper.

The testing device releases each operated relay upon the completion of each test, thereby leaving that relay free for subsequent operation by its associated counter upon the completion of the next one hundred units of work. In a shop wherein the maximum possible speed of the presses is 48,000 per hour, or 800 per minute, the relay can receive a maximum number of eight impulses per minute on the basis of one impulse per 100 papers, and the minimum time between impulses is one-eighth of a minute. In such a system, the testing device is arranged to test and release each operated relay once each one-tenth of a minute, or once each six seconds, thereby making it impossible for two impulses to be sent from the associated counter during the time between successive tests. Thus, each relay is sure to be tested and, if operated, sure to be released before a second impulse could possibly be sent thereto from the counting mechanism on its associated press.

As previously stated, my registering means is provided with one relay for each machine and each relay is adapted to receive one impulse of current per 100 papers turned out by its associated press. It is one of the objects of the present invention to provide separate switching means for disabling the respective relay circuits, the switching means of each relay being controlled by the switch that controls the associated press. When the press is stopped by opening the switch that controls the operation of the press, then the associated relay circuit is likewise opened, thereby preventing the operation of this relay should the associated press or the associated counter be rotated for any purpose whatsoever.

The disabling of any one or more relays of the register does not affect the operation of the remaining relays.

The attainment of the above and other objects of the present invention will be apparent from the following specification taken in conjunction with the accompanying drawing forming a part thereof:—

The single figure of the accompanying drawing shows, in diagrammatic form, one embodiment of my invention.

I have shown, by way of illustration, my invention applied for totalizing the output in a system including six presses. It is, however, to be understood that the apparatus is equally applicable for any larger or smaller number of presses and the manner in which the same may be used with a different number of presses will be apparent from the following description. One of the presses is indicated at 1 and is operated by a motor which is controlled by means of a switch 2 through the usual instrumentalities and the connection between the motor and the switch 2 is indicated by a dotted line to indicate that the control is exercised through the usual electromagnetic switches and starting and control apparatus. A disk 3 is rotated by the press 1, suitable gearing being interposed between the motor and the disk 3 so that the disk makes one revolution for each ten papers output of the press. It is of course understood that the adjustment may be such that the disk will make one revolution for any other predetermined definite number of papers output of the press. A rod 4 is connected to the disk 3 by means of a pin located eccentrically of the center of rotation of the disk so that upon rotation of the disk the rod 4 is reciprocated. The rod 4 controls a counter 5 for totalizing the output of the individual press 1. Connected to the opposite end of the rod 4 is a crank arm 6 which is actuated thereby, said crank arm including a pawl 7 which is adapted to operate a ratchet 8 having, preferably, ten teeth so that the ratchet 8 will make one complete revolution for every ten revolutions of the disk 3. The ratchet 8 controls a cam 9 which is adapted to momentarily close a normally open switch 11 once for each revolution made by the ratchet 8. The switch 11 is adapted to send an impulse of current to a register relay 10 of a register device R. The register device is provided with a number of register relays, one for each press, said relays being indicated at 20, 30, 40, 50 and 60. My totalizing mechanism includes a testing device indicated at T upon which the respective relays are adapted to place a characteristic electric potential. The testing device is adapted to successively test the respective relays for the characteristic potential and to bring about the operation of a totalizing counter each time an operated relay is found. The testing device includes a number of normally closed switch contacts, indicated at 12, 22, 32, 42, 52 and 62, said switch contacts being associated with the respective relays 10 to 60. The testing device is shown as provided with fifteen normally closed switch contacts so that this testing device may be used in connection with a system including fifteen presses. For use in larger shops, the testing device is provided with more of those normally closed switches. The testing device includes an arm 70 which is adapted to be constantly rotated by a motor 71, and is adapted to open the respective normally closed switch contacts as it passes over the same. The switch contacts are maintained open only so long as the switch arm 70 remains over them and as soon as the switch arm 70 passes beyond any one of the switches it again closes. The testing device is provided with an inner row of contacts 73 isolated from one another and an outer row of contacts 74 electrically connected to one another. The switch arm 70 is provided with a contact portion 75 which is adapted to bridge the contacts of the inner row 73 with the corresponding contacts of the outer row 74 as it moves over the same. A counter 77 is adapted to be connected in an electric circuit each time the arm 75 passes over a contact 73 that has a characteristic potential applied thereto, in a manner to be presently more fully set forth, thereby totalizing the number of times such a contact is passed over by the arm 70. The circuit through the switch contacts 11, controlled by the cam 9, is in turn controlled by a switch 13 which is preferably interlocked with the switch 2 so that when the switch 2 is open, the switch 13 likewise is open, and when the switch 2 is closed the switch 13 is likewise closed.

An explanation will now be given of the manner of operation of my totalizing device. Assume that the press is operating. Each time that the press turns out ten papers, the disk 3 will make one revolution, thereby actuating the counter 5 once, and will rotate the ratchet 8 one-tenth of a revolution. During each complete revolution of the ratchet 8, the projection 9 closes the switch contact 11 once, thereby establishing an operating circuit for the relay 10, said circuit extending as follows:—From the negative line 80, through the common wire 81 and the closed switch 13, through the closed contact 11 and the winding of the relay 10, thence by way of the conductor 82 and the normally closed switch 12 to the common conductor 83 which is connected to the positive line 84. The relay 10 operates and at its now closed contact 86, it establishes a locking circuit for itself, said locking circuit extending from the negative conductor 80 to the conductor 87 and the front contact 86 of the relay 10, thence to the conductor 82 and the closed switch contact 12 to the positive side of the line. A moment later, the switch contact 11 opens, but the relay 10 remains locked in its operative position. At its now closed contact 86, the relay 10 places a negative potential upon the contact 73, said potential being extended from the negative line 87 and the closed contact 86, hence by way of the conductor 88 to the contact 73. When the switch arm 70 of the testing device T comes opposite the contact 73 associated with the relay 10 a circuit is established for the totalizing counter 70, said circuit extending from the negative potential on the contact 73, by way of the bridge 75 to the contact 74, hence by way of the totalizing counter to the negative side of the line 84. The totalizing counter 77 receives an impulse of circuit and operates once. The arm 70 likewise opens the switch contact 12, thereby opening the locking circuit for the relay 10, causing this relay to fall back. This conditions the relay 10 for subsequent operation when the projection 9 again closes the contact 11. In the operation of the present device, it is to be noted that should the contact 11 close at the instant that the arm 70 is maintaining the associated switch 12 open, then the relay 10 will not operate. However, negative potential will be applied to the conductor 88 by way of the closed contact 11 and the switch 13 rather than by way of the contact 86 of the relay 10, hence the totalizing meter 77 will, nevertheless, be operated to advance one notch.

The relay 20 has associated therewith a contact 21 similar to the contact 11 and similarly controlled by a projection 29 similar to the projection 9 and operated by a disk similar to the disk 2 but associated with the second press. Likewise, relay 30 has a contact 31 which is operated by a projection 39 similar to the projection 9 and operated by a disk similar to the disk 3 and associated with the third press. The relays 40, 50 and 60, as well as any other relays that may be provided on the register, are likewise operated in a similar manner by their corresponding presses. Each of the projections 29 and 39 is operated in the same manner as is the projection 9 so that each projection closes its associated contact when the press which operates the same turns out 100 papers. Each time one of the relays 20, 30, 40, 50, 60, or the like, is operated, it places negative potential upon its associated contact 73 in the testing device, and each time that the arm 70 passes over a contact 73 that has negative potential thereon, it causes the counter 77 to advance one notch. Likewise, each time that the arm 70 passes over one of the normally closed switches, such as 12 to 62, it opens the switch, thereby bringing about a release of the corresponding relay if that relay happens to be operated. It is of course to be understood that each press is provided with equipment similar to that shown in connection with the press 1 so that each press has an individual counter such as the counter 5.

The presses may, of course, be variable speed operated, or they may be constant speed operated. In either event there is a certain maximum speed beyond which they are never operated. Assume that the maximum speed of operation of each of the presses shown is such as to turn out 48,000 papers per hour. This means that the maximum output per press will be 800 papers per minute, and therefore the maximum speed of any one of the ratchets 8 will be eight revolutions per minute or one revolution for each one-eighth of a minute. Under these circumstances, the motor 71 is operated at such a speed as to rotate the arm 70 preferably at 10 revolutions per minute. The invention is, however, not limited to this particular speed, since the arm 70 may be operated at any speed above eight revolutions per minute without altering the manner of operation of the testing and releasing device T. This is necessary in order to guard against the possibility of the contact 11 operating a second time before the relay 10 has been released after its first operation. With this arrangement it is certain that once the relay 10 is operated, it will be released before the contact 11 could possibly close a second time for reoperation of the relay. It is thus apparent that the totalizing counter 77 will receive an impulse of current for each operation of any one of the relays 10 to 60, inclusive, and, since each relay operates once upon every completion of 100 papers by its associated press, it is apparent that the totalizing counter 77 will indicate, in terms of hundreds, the total number of papers turned out by all of the presses.

When the press 1, or any of the other presses, is stopped by the opening of the switch 27, the switch 13 is thereby also opened, thus preventing the operation of the relay 10 by a closure of the contacts 11, hence, when the press is stopped the associated counter may be manipulated as desired, to reset the same if necessary, without operating the associated relay 10 upon the closure of the contacts 11. This may be done to any press while the other presses are in operation and the testing and totalizing device is operating to totalize the outputs of the operating presses.

While I have herein shown and described a preferred embodiment of my invention, it is to be understood that the invention is not limited to the precise details herein shown, the same being shown merely for illustrative purposes, nor is the invention limited for use on presses, since it may likewise be used in connection with other kinds of machines where it is desirable to obtain a reading of the total output of a plurality of machines.

What I consider new and desire to secure by Letters Patent is:—

1. In combination, a totalizing counter plurality of individual counters, individual control circuits controlled by the respective individual counters, means controlled by the individual counters for characteristically conditioning their associated circuits, continuously operated commutating means for successively connecting the totalizing counter to the respective circuits for operation over the circuits that have been characteristically conditioned, and switching means controlled by the commutating means for removing the characteristic condition of each circuit over which the totalizing counter has been operated.

2. In combination, a totalizing counter, a plurality of individual counters, individual control circuits controlled by the respective individual counters, means controlled by the individual counters for characteristically conditioning their associated circuits, continuously operated commutating means for successively connecting the totalizing counter to the respective circuits for operation over the circuits that have been characteristically conditioned, and switching means controlled by the commutating means for removing the characteristic condition of each circuit over which the totalizing counter has been operated, said commutating means operating to periodically connect with each circuit at intervals of time less than the minimum amount of time required for successive operations of any one of the individual counters.

3. A totalizing device including a plurality of contracts arranged in a circle, separate means for characteristically conditioning the respective contacts, a totalizing counter, a constantly rotating contact making switch arm successively engaging the rspective contacts and establishing a circuit extending through the engaged contact for operating the totalizing counter each time that the contact making arm engages a contact that is characteristically conditioned, and separate switching means associated with the respective contacts and actuated by the contact making switch arm for removing the characteristic condition from the respective contacts as the contact making arm passes over them.

4. In combination with a plurality of counters, a totalizing device including a plurality of contacts arranged in a circle, one contact for each counter, separate means controlled by the respective counters for characteristically conditioning the respective contacts, a totalizing counter, a constantly rotating contact making switch arm successively engaging the respective contacts and establishing a circuit extending through the engaged contact for operating the totalizing counter each time that the contact making arm engages a contact that is characteristically conditioned, and separate switching means associated with the respective contacts and actuated by the contact making switch arm for removing the characteristic condition from the respective contacts as the contact making arm passes over them.

5. In combination with a plurality of counters, a totalizing device including a plurality of contacts arranged in a circle, one contact for each counter, separate means controlled by the respective counters for characteristically conditioning the respective contacts, a totalizing counter, a constantly rotating contact making switch arm successively engaging the respective contacts and establishing a circuit extending through the engaged contact for operating the totalizing counter each time that the contact making arm engages a contact that is characteristically conditioned, and separate switching means associated with the respective contacts and actuated by the contact making switch arm for removing the characteristic condition from the respective contacts as the contact making arm passes over them, the contact making arm making a complete revolution in an interval of time less than the maximum amount of time required for successive operation of any one of the first mentioned counters.

In witness whereof, I hereunto subscribe my name this 14th day of February, 1930.

FERDINAND B. TROUTMAN.